UNITED STATES PATENT OFFICE.

RHETHERFORD B. MARTIN, OF NEW YORK, N. Y.

METHOD OF TREATING MANUFACTURED RUBBER.

1,410,699.   Specification of Letters Patent.   Patented Mar. 28, 1922.

No Drawing.   Application filed May 14, 1919.   Serial No. 297,113.

*To all whom it may concern:*

Be it known that I, RHETHERFORD B. MARTIN, a citizen of the United States, and resident of the borough of Manhattan, city of New York, and State of New York, have invented certain new and useful Improvements in Methods of Treating Manufactured Rubber, of which the following is a specification.

My present invention relates to a method of retarding the deterioration in manufactured rubber goods. It is well known that in manufactured rubber goods, such as automobile tires, garden hose and the like, that the rubber loses its life and becomes hard after it has been manufactured for some time owing to various causes such as slow vulcanization due to the heat, or oxidization due to the atmosphere and to various other causes. I have discovered that by treating manufactured rubber goods with a coating of an organic compound containing nitrogen and hydrogen, the rubber may be kept in nearly its original elastic condition and that deterioration is retarded if not entirely prevented. There are many compounds containing nitrogen and hydrogen which come within the scope of my invention, such as amines (primary) of which amidobenzene or phenylamine is an example; amines (secondary) of which diethylaniline is an example; amines (tertiary) of which dimethyl-a-naphthylamine is an example; diamines, p-amidobenzyl-dimethylamine; carboxylic acid group, oxybenzoic acid; amidophenols and their derivatives, o-amidophenol or m-amidophenol. The organic compound which I prefer to use is phenylamine. If an automobile tire is treated with a coating of phenylamine and allowed to stand twenty-four hours until it has had an opportunity to soak into and penetrate the rubber the life of the tire is greatly prolonged. I have discovered that by treating tires in accordance with the above method about once in every three months that many times the normal service from the tires is obtained.

I prefer to apply the phenylamine with a brush and set the rubber article aside for twenty-four hours, allowing the coating to be absorbed by the rubber. It is quite obvious however, that there are other ways in which the material can be applied other than with a brush, for example, the rubber goods may be dipped into the solution or the solution may be applied in the form of a spray or vapor.

I have found in many instances that manufactured rubber which has begun to harden and lose some of its elasticity, may be restored to a condition approaching its original condition by being treated by my method. In some instances it may be found desirable to add to the phenylamine a binding material to cause it to adhere to rubber. I have used cotton seed oil for this purpose, which while it causes the phenylamine to adhere to the rubber long enough to be absorbed, nevertheless exercises no deleterious effect upon the rubber itself.

I claim:

1. The method of treating hardened rubber which comprises applying to the surface of the rubber an oil free from injurious effect upon the rubber, and a rubber restoring substance mixed therewith.

2. A rubber article comprising rubber softened by phenylamine, and an oil neutral towards the rubber holding phenylamine thereon.

3. A rubber article comprising rubber softened by an amino derivative and an oil neutral towards rubber holding some of said derivative thereon.

4. The method of treating manufactured rubber which consists in applying to the surface of the rubber a solution containing phenylamine and a binder.

5. The method of treating manufactured rubber which consists in applying to the surface of the rubber a solution containing phenylamine and cotton seed oil.

In testimony whereof, I have affixed my signature to this specification.

RHETHERFORD B. MARTIN.